United States Patent [19]

Orban

[11] Patent Number: 4,513,238

[45] Date of Patent: Apr. 23, 1985

[54] AUTOMATIC BATTERY CHARGER WITH THERMAL CONTROL

[75] Inventor: John M. Orban, Santa Monica, Calif.

[73] Assignee: Vivitar Corporation, Santa Monica, Calif.

[21] Appl. No.: 494,562

[22] Filed: May 13, 1983

[51] Int. Cl.³ ............................................. H02J 7/00
[52] U.S. Cl. ...................................... 320/23; 320/36; 320/40; 320/48
[58] Field of Search ....................... 320/22, 23, 35, 36, 320/39, 40, 48

[56] References Cited

U.S. PATENT DOCUMENTS 4,006,397  2/1977  Catotti et al. ........................... 320/39
4,386,308  5/1983  Emile, Jr. et al. ...................... 320/22

OTHER PUBLICATIONS

Service Manual, Pub. No. 3746069, Nov. 1977, Vivitar Corporation.

Primary Examiner—William H. Beha, Jr.
Assistant Examiner—Anita M. Ault
Attorney, Agent, or Firm—Lyon & Lyon

[57] ABSTRACT

There is disclosed herein a battery charger, such as for use with compact low voltage batteries of the type used in consumer electronic products. The charger can sense both voltage and temperature to prevent either an over voltage condition or over temperature condition from damaging the battery being recharged. The charging circuit has fast and slow charge rates, and the circuit oscillates or automatically switches from one rate to the other without requiring the user to manually select or operate a switch for selecting a particular charge rate. The user merely inserts the battery into the charging circuit at a time when it is in the fast mode or slow mode which is indicated by a suitable visual or other indicator device so as to provide a "time selection" of charge rate. The circuit can use a thermal oscillator or an electronic oscillator for switching between the fast and slow rates.

8 Claims, 1 Drawing Figure

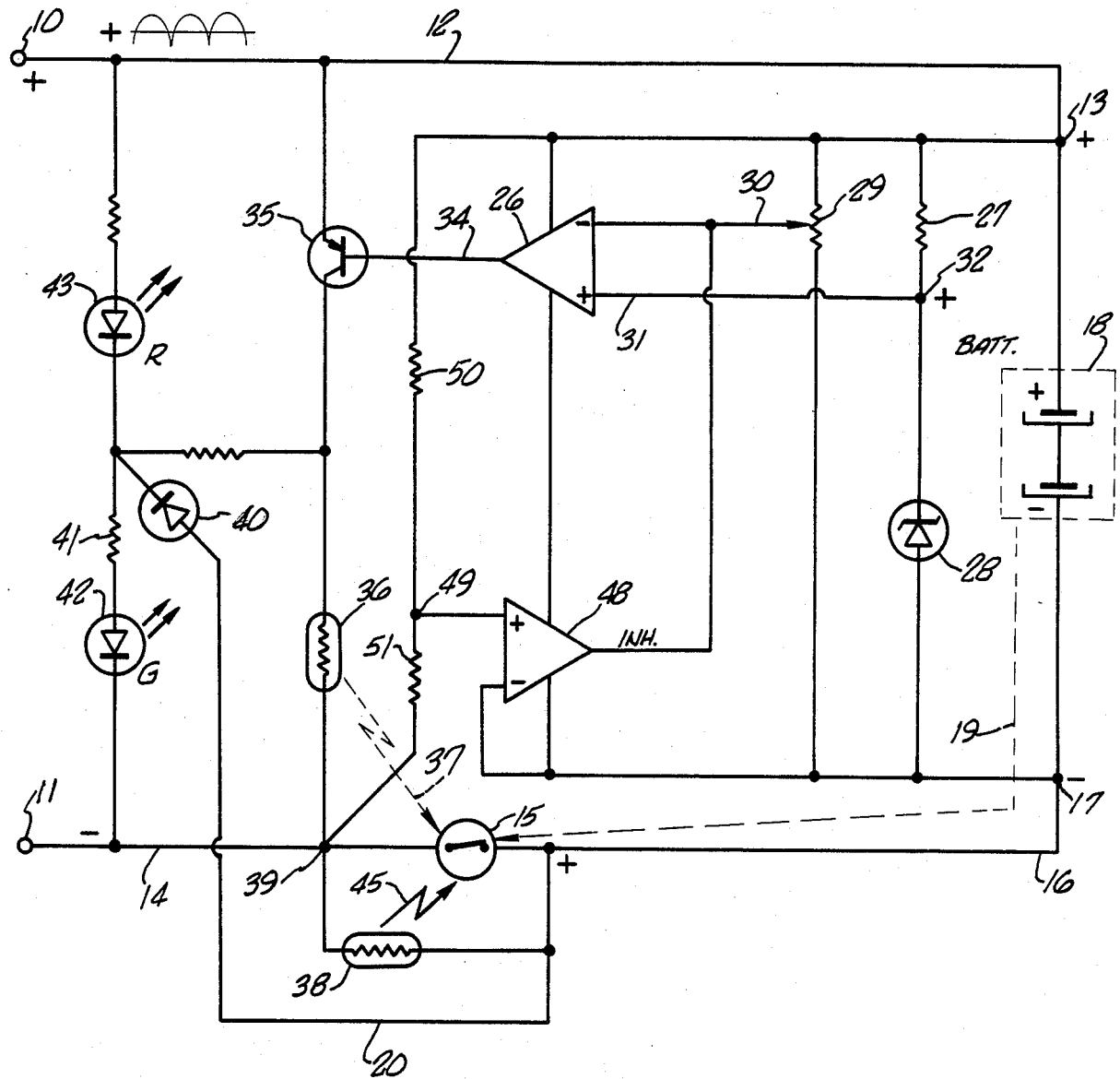

AUTOMATIC BATTERY CHARGER WITH THERMAL CONTROL

BACKGROUND OF THE INVENTION

The present invention relates to battery chargers, and more particularly to a battery charger incorporating an automatic fast/slow charge mode selector.

Various forms of battery chargers have been developed from time to time. Low voltage, e.g., one and one-half volts, three volts and so on, rechargable batteries are widely used in electrical and electronic devices, such as various forms of consumer electronic devices. Notable among these are electronic flash units, many of which use individual one and one half volt batteries or a suitable battery pack. It is desirable to be able to maintain such batteries in a charged condition, and it is particularly desirable on numerous occasions to be able to rapidly charge such batteries. Various forms of battery chargers are available on the market, many of which have only a fixed rate of charge. One presently available battery charger having both slow charge and fast charge capabilities is the Charge 15 manufactured by Vivitar Corporation. This form of charger incorporates suitable voltage and temperature sensing circuits to switch from the fast charge mode to the slow charge mode in the event the temperature of the battery, or the temperature in the vicinity of the battery, rises too high or the voltage of the battery rises too high. Either condition could result in damage to the battery.

In a fast automatic charger there usually is a thermal switch of some nature that terminates the fast charge before the battery temperature reaches a destructive value after the battery has been charged under high ambient temperature conditions. There likewise usually is a voltage cutoff system that terminates the fast charge before the voltage reaches a destructive value after recharge and at low ambient temperature conditions or when the battery was already fully charged. The use of both systems is known. See for example U.S. Pat. No. 4,006,397.

Prior fast/slow battery chargers have required manual switching devices whereby the user selects the fast charge mode or slow charge mode, or required various switching components for causing the charger to switch from the fast to the slow charge mode upon predetermined high voltage and high temperature conditions. Thus, some devices of this nature have been cumbersome to use and relatively expensive to manufacture.

According to the present invention, the charger of the present invention can use a thermal or other form of oscillator circuit for automatically switching between fast and slow charge modes so that the the mode desired by the user can be readily selected merely by inserting the battery into the charger at a time when the charger is in the desired mode, as contrasted to requiring the user to operate a switch or other device for selection of the charge mode. This provides for "time selection" of charge mode. Additionally, a fast/slow battery charger is provided wherein one thermal switch can be used to terminate the fast charge upon either or both of a high temperature condition or a high voltage condition.

A battery charger according to the present invention through the use of an oscillator system, has a number of features and advantages. When no battery is inserted into the charger, a thermal switch or other oscillatory type control system, will cycle at a slow rate (such as ten seconds per period) and alternately set the charger in the fast or slow mode to enable "time" selection by the user of the desired charge mode.

The time selection of charge mode obviates the necessity for a manual switch or reset button which the user normally would need to actuate to select the fast or slow charge mode. According to the present invention, before the battery to be recharged is inserted into the charger, the charger circuit alternately switches between the fast and slow charge modes, and the mode is indicated by a suitable indicator, such as a red light for fast charge and a green light for slow charge. After the battery is inserted, the charger stays in the mode it was in at the time the battery was inserted. This automatic time selection of mode not only obviates the need for a manually operable switch, but also obviates the problem occasioned by the user trying to hold the switch in a fast mode when the automatic detection circuitry (for temperature and/or voltage) indicates that the unit should be in the slow mode. With a charger constructed in accordance with the present invention, the user need only look at an indicator, and insert the battery when the indicator is in the fast or slow charge mode desired.

Furthermore, through the use of one thermal switch to terminate the charge upon either over temperature or over voltage conditions the usual additional electronic switch (such as an SCR, transistor, etc.) can be eliminated thereby reducing the cost and size of the charger. When the battery to be charged only has a few cells (such as two) the losses in the electronic control system or control switch can be as high as forty percent of the useful output of the charger, thereby creating unwanted heat and requiring a large transformer and larger power input. Furthermore, electronic elements which frequently are used in such chargers are unnecessarily fast and sensitive to spurious signals such as RF, and therefore in a simple consumer-oriented charger filter circuits and/or time delay or integration circuits are used thereby requiring additional components and the attendant complexity. A thermal switch according to the present invention is naturally slow and therefore is immune to power line surges, switch contact chattering, and other transients likely to occur in an uncontrolled environment of a consumer type of charger. The necessary latching capability required to hold the charger safely in a desired mode can be achieved by a single inexpensive component, such as a heating resistor, associated with a thermal switch. When the battery is removed from the charger, the latching component will automatically cool and the thermal switch will automatically be reset.

Accordingly, it is an object of the present invention to provide an improved battery charger.

Another object of the present invention is to provide a battery charger having an automatic time mode selector for automatically causing the charger to switch between fast and slow charge modes until a battery is inserted therein to be charged.

A further object of the present invention is to provide an improved form of battery charger using one thermal switch to terminate a fast charge mode upon the existence of either or both of a predetermined temperature condition and predetermined voltage condition.

These and other objects and features of the present invention will become better understood through a consideration of the following description taken in conjunction with the drawing in which the single FIGURE shows an exemplary embodiment of a circuit for a battery charger according to the present invention.

DETAILED DESCRIPTION

Turning now to the drawing, an exemplary circuit for a battery charger according to the present invention is shown having input terminals 10 and 11 which are connected to a suitable conventional transformer and rectifier circuit (not shown) for providing rectified voltage across the terminals 10–11. The terminal 10 is connected through a line 12 to a positive output terminal 13, and the terminal 11 is connected through a line 14 to a thermal switch 15, and from the thermal switch 15 through a line 16 to a negative output terminal 17. A battery to be recharged, indicated diagrammatically at 18, is connected between the positive and negative terminals 13 and 17 as indicated in the drawing. The thermal switch 15 is disposed in contact with, or otherwise to physically detect the temperature of, the battery 18 as indicated by a line 19 so as to cause the thermal switch 15 to open when the battery reaches a predetermined temperature, such as forty five degrees centigrade. When the thermal switch 15 is closed as indicated in the drawing, the charger is in a "fast" charge mode for charging the battery at a fast rate (such as fifteen minutes for a full recharge). Another current path, bypassing the thermal switch 15, is provided via a line 20 to provide a slow or trickle charge (e.g., six hours rate) which will be described subsequently.

As noted earlier, a feature of the present invention is that a single thermal switch, namely the switch 15, can function to switch the charging circuit from the fast to the slow charge rate either upon reaching a predetermined voltage condition or a predetermined temperature condition. With respect to the voltage condition, a comparator 26 functioning as a voltage cutoff circuit is provided for sensing the voltage of the battery 18. A resistor 27 and zener diode 28 are connected in series across the output terminals 13 and 17, as is a potentiometer 29. The movable tap 30 of the potentiometer 29 is connected to one input of the comparator 26, and the other input of the comparator 26 is connected via a line 31 to a junction 32 intermediate the resistor 27 and diode 28. The voltage at 32 provides a reference, and the voltage at tap 30 gives a voltage proportional to the actual voltage of the battery 18. Thus, as is well known to those skilled in the art, when the voltage at the tap 30 reaches a given level with respect to the reference voltage at terminal 32, the comparator provides an output on an output line 34. This output turns on a transistor 35. The emitter of this transistor is connected to the positive supply line 12, and the collector thereof is connected through a heating resistor 36 to the negative supply line 14. The resistor 36 is in thermal contact with thermal switch 15 as indicated by a line 37, or is suitably disposed such that heating of the resistor 36 when the transistor 35 is on will cause the thermal switch 15 to open. Preferably the components are such that the thermal switch 15 will open in approximately ten seconds after the transistor 35 is turned on. Thus, when the charging voltage of the battery 18 reaches a sufficient level, the comparator 26 provides a signal to turn on the transistor 35. The resulting current through the resistor 36 causes the thermal switch 15 to open a short time later.

The battery can now continue to charge at a slow charge rate since the lower output terminal 17 is connected through the line 16 and a thermal heating resistor 38 to the negative line 14 at junction 39, and the terminal 17 is also connected to the line 20 which is connected in turn through a diode 40, a resistor 41, and an LED 42 to the negative supply line 14. These paths provide a trickle current path so that the battery will slowly charge. Most of the trickle current passes through the resistor 38 and some passes through the LED 42 to indicate the slow or trickle charge mode. The heating resistor 38 likewise is in thermal contact with the switch 15 as indcted at 45 or is otherwise disposed to convey heat to the thermal switch. When the thermal switch 15 is opened, some current will flow through the resistor 38 in the slow charge mode to insure that the thermal switch 15 remains open when in the slow charge mode so long as there is a battery 18 connected to the terminals 13 and 17. The trickle charge path through the resistor 38 and through the diode 40 maintains the LED 42, which typically is a green LED, on so long as the thermal switch 15 is open even if the voltage cutoff comparator 26 is inhibited as is described below.

A comparator 48 which functions as an inhibit circuit has one input connected to the negative battery terminal 17 and another input connected to a junction 49 between voltage divider resistors 50 and 51. The resistors 50 and 51 are connected in series from the positive output terminal 13 to the negative line 14. The inhibit circuit 48 functions to inhibit the voltage cutoff circuit 26 as soon as the thermal switch 15 opens and during every charging current pulse. With respect to the latter, the inhibit circuit 48 turns off the circuit 26 which turns off the transistor 35 during each charging current pulse (of the rectified waveform). The reason for this is that it is undesirable to sense the voltage of the battery 18 during or near the peak of the charging current. Therefore, the circuit 26 is inhibited at that time so that the voltage of the battery 18 is sampled only during the non-peak periods of the charging current. Stated differently, the voltage cutoff circuit 26 is inhibited during the period of conduction of current in the battery 18.

Furthermore, when the battery 18 is removed from the charging circuit, the voltage at the terminal 13 rises, and the voltage cutoff circuit 26 senses this rise in voltage and turn on to therefore maintain the transistor 35 on. Current through the resistor 36 then would heat the thermal switch 15 and keep the thermal switch 15 in an open condition and the same would not be reset. However, the inhibit circuit 48 prevents this from occurring inasmuch as the inhibit circuit 48 inhibits (or turns off) the circuit 26 as soon as the thermal switch 15 opens so as to allow the thermal switch to be reset (closed) under appropriate circuit operating conditions. The resistance of the wire 16 from the negative terminal 17 to the junction 39 between the resistors 36 and 38, along with the values of the resistors 50 and 51 provide an appropriate voltage level at the junction 39 to cause the inhibit circuit 48 to operate and inhibit the circuit 26 during the charging current pulses. The junction 39 is connected to the positive input of the inhibit circuit 48, and the output of the inhibit circuit 48 goes negative to pull down the voltage at the tap 30 of the potentiometer 29 to turn off or inhibit the circuit 26 when the junction 39 goes to a predetermined negative voltage. The values of the resistors 50 and 51 are selected with respect to the resistance of the thermal switch 15 to obtain the necessary negative voltage at the junction 39 to allow the inhibit circuit 48 to turn off the circuit 26. As an example, if the battery 18 to be charged is a three volt battery, and a voltage of three millivolts at the junction 39 is a sufficient negative voltage to cause the inhibit circuit 48 to inhibit the circuit 26, the value of the resistor 50 would be one megohm and the value of the resistor 51 would be one kilohm so as to provide three millivolts at the junction 39.

An oscillator or on/off circuit thus is formed by the circuit 26, transistor 35, switch 15 and inhibit circuit 48, and which operates the indicators 42 and 43. As will be apparent to those skilled in the art, a fully electronic oscillator can be provided if use of the thermal switch 15 is not desired.

It will be apparent from the foregoing that the thermal switch 15 can sense an over temperature condition and open, and it is caused to be opened by an over voltage condition by virtue of the operation of the comparator 26, transistor 35 and heating resistor 36. When no battery 18 is present in the charger, the thermal switch 15 will turn on and off, and the green 42 and red 43 LEDs will go on and off at a suitably slow rate (such as about every ten seconds). The user can look at these lights, and if a fast charge is desired the battery 18 is inserted while the red LED 43 is on. If a slow charge is desired, the battery is inserted while the green LED 42 is on. If the fast charge mode is selected, the circuit will switch to the slow charge mode when the temperature of the battery reaches the preset level or the voltage reaches the preset level. While a thermal switch 15 has been shown because it is advantageously used to minimize the number and cost of components, an oscillator circuit could be used if desired while still retaining the significant feature of the automatic time mode selector concept hereof.

While the presently preferred embodiments of the invention have been illustrated and described, modifications and variations thereof will be apparent to those skilled in the art given the teachings herein, and it is intended that all such modifications and variations be encompassed within the scope of the appended claims.

What is claimed is:

1. A battery charger for removable rechargable batteries, the charger having fast charge and slow charge modes comprising
    charging circuit means for providing to a removable battery to be charged charging current either at a fast charge rate or a slow charge rate,
    oscillator circuit means for switching said charging circuit means between said fast charge rate and slow charge rate automatically prior to insertion of a battery to allow a user to select a desired charging mode, and
    indicator means in said charger for indicating to a user whether the charger is operating at the fast charge rate or the slow charge rate.

2. A battery charger having fast charge and slow charge modes comprising
    charging circuit means for providing to a battery to be charged charging current either at a fast charge rate or a slow charge rate,
    oscillator circuit means for switching said charging circuit means between said fast charge rate and slow charge rate automatically at a substantially constant frequency, and
    indicator means in said charger for indicating whether the charger is operating at the fast charge rate or the slow charge rate.

3. A battery charger as in claim 2 wherein said frequency is approximately once in ten seconds.

4. A battery charger having fast charge and slow charge modes comprising
    charging circuit means for providing to a battery to be charged charging current either at a fast charge rate or a slow charge rate, said charging circuit means including output charging terminals to which a battery to be charged is adapted to be connected,
    oscillator circuit means for switching said charging circuit means between said first charge rate and slow charge rate automatically and wherein said oscillator circuit means stops switching between the fast charge and slow charge rates when a battery is connected to said charging terminals to thereby allow the battery to be charged at the fast charge or slow charge rate which the battery charger was operating in at the time the battery is connected to the charging terminals, and
    indiator means in said charger for indicating whether the charger is operating at the fast charge rate of the slow charge rate.

5. A battery charger having fast charge and slow charge rates and wherein either rate may be selected based upon the time of connection of a battery to be charged to the charger comprising
    charging circuit means for providing to a battery to be charged charging current either at a fast charge rate or a slow charge rate, said charging circuit means including charging terminals to which a battery to be charged is adapted to be connected,
    oscillator circuit means for alternating said charging circuit means between said fast charge rate and slow charge rate substantially continuously when no battery is connected to said charging terminals, said oscillator circuit means functioning to cause the charging circuit means to terminate alternating between said fast charge rate and slow charge rate when a battery to be charged is connected to said charging terminals to thereby allow the battery to be charged at the charge rate the charging circuit means was operating in at the time the battery is connected to the charging terminals, and
    indicator means in said charger for indicating whether the charger is operating at the fast charge rate or the slow charge rate.

6. A battery charger as in claim 5 wherein
    said oscillator means alternates the charging circuit means between the fast charge rate and the slow charge rate at a substantially constant frequency of approximately once in ten seconds, and said indicator means comprises lamp means for providing two different visual indications respectively representing said fast and slow charge rates.

7. A battery charger having fast charge and slow charge modes comprising
    input power terminals adapted to be connected to a source of power, output charging terminals to which a battery to be charged is adapted to be connected,
    thermal switch means connected with said input and charging terminals to form a charging circuit from the power input terminals through the charging terminals and thermal switch means, said thermal switch means being disposed to thermally sense a predetermined temperature level of a battery when such battery is connected between said charging terminals for causing said thermal switch means to open and terminate the supply of fast charging current to such battery, shunt circuit means providing a slow charge current path around said thermal switch means when said thermal switch means is open, voltage sensing means connected with the charging terminals for sensing the voltage thereof during non-peak current cycles of the charging current to a battery connected with the battery charging terminals, said voltage sensing means adapted to operate switch means to supply heat to said thermal switch means when the voltage of such battery reaches a predetermined value, and indicator means in said charger for indicating whether the charger is in the slow charge or the fast charge mode.

8. A battery charger as in claim 7 wherein said voltage sensing means comprises a voltage cutoff circuit responsive to the voltage of said charging terminals for operating said switch means when the voltage across said charging terminals reaches a predetermined level, and said switch means includes thermal means for applying heat to said thermal switch means, and said voltage sensing means further including inhibit circuit means for inhibiting the operation of the voltage cutoff circuit when the thermal switch means opens and during said non-peak charging current cycles.

* * * * *